(12) United States Patent
Irani et al.

(10) Patent No.: US 9,631,489 B2
(45) Date of Patent: Apr. 25, 2017

(54) SYSTEMS AND METHODS FOR MEASURING PARAMETERS OF A FORMATION

(75) Inventors: Cyrus A. Irani, Houston, TX (US); Daniel Robert Buller, Shreveport, LA (US); Ronald Johannes Dirksen, Spring, TX (US); Sami Abbas Eyuboglu, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 297 days.

(21) Appl. No.: 14/112,385

(22) PCT Filed: Jun. 15, 2011

(86) PCT No.: PCT/US2011/040417
§ 371 (c)(1),
(2), (4) Date: Oct. 17, 2013

(87) PCT Pub. No.: WO2012/173608
PCT Pub. Date: Dec. 20, 2012

(65) Prior Publication Data
US 2014/0027112 A1    Jan. 30, 2014

(51) Int. Cl.
| | |
|---|---|
| *E21B 49/10* | (2006.01) |
| *E21B 49/08* | (2006.01) |
| *G01V 9/00* | (2006.01) |
| *E21B 43/26* | (2006.01) |
| *E21B 47/02* | (2006.01) |
| *E21B 47/06* | (2012.01) |
| *E21B 49/00* | (2006.01) |

(52) U.S. Cl.
CPC .............. *E21B 49/08* (2013.01); *E21B 43/26* (2013.01); *E21B 47/02* (2013.01); *E21B 47/06* (2013.01); *E21B 49/006* (2013.01); *E21B 49/10* (2013.01); *G01V 9/00* (2013.01)

(58) Field of Classification Search
CPC ...................................................... E21B 49/10
See application file for complete search history.

(56) References Cited

U.S. PATENT DOCUMENTS

| | | |
|---|---|---|
| 4,860,581 A | 8/1989 | Zimmerman et al. |
| 5,230,244 A | 7/1993 | Gilbert |
| (Continued) | | |

OTHER PUBLICATIONS

International Search Report and Written Opinion, International Application No. PCT/US2011/040417, 10 pgs., Mar. 6, 2012.

(Continued)

*Primary Examiner* — Giovanna C Wright
(74) *Attorney, Agent, or Firm* — Benjamin Fite; Baker Botts L.L.P.

(57) ABSTRACT

A method of measuring parameters of a formation along multiple axes is disclosed. A formation tester tool is introduced into a wellbore. The formation tester tool includes a first probe oriented at an angle from a second probe about an axis of the formation tester tool. The first and second probes are positioned against a surface of the wellbore. Fluid is injected via at least one of the first and second probes. Pressure parameters corresponding to the fluid injected into the formation are monitored. Formation stresses about the formation fractures along multiple axes are determined based, at least in part, on the pressure parameters.

11 Claims, 5 Drawing Sheets

(56) References Cited

U.S. PATENT DOCUMENTS

| | | | | |
|---|---|---|---|---|
| 6,157,893 | A * | 12/2000 | Berger | E21B 49/008 |
| | | | | 702/12 |
| 6,581,455 | B1 * | 6/2003 | Berger | E21B 21/103 |
| | | | | 175/50 |
| 6,871,713 | B2 | 3/2005 | Meister et al. | |
| 2011/0107830 | A1 * | 5/2011 | Fields | E21B 7/061 |
| | | | | 73/152.41 |

OTHER PUBLICATIONS

Second Written Opinion, International Application No. PCT/US2011/040417, 5 pgs., May 28, 2013.
Third Written Opinion, International Application No. PCT/US2011/040417, 4 pgs., Aug. 9, 2013.

* cited by examiner

SYSTEMS AND METHODS FOR MEASURING PARAMETERS OF A FORMATION

CROSS-REFERENCE TO RELATED APPLICATION

This application is a U.S. National Stage Application of International Application No. PCT/US2011/040417 filed Jun. 15, 2011, and which is hereby incorporated by reference in its entirety.

BACKGROUND

The present disclosure generally relates to testing and evaluation of subterranean formations and formation fluids and, more particularly, to systems and methods for measuring parameters of a formation.

It is well known in the subterranean well drilling and completion art to perform tests on formations penetrated by a wellbore. Such tests are typically performed in order to determine geological or other physical properties of the formation and fluids contained therein. Measurements of parameters of the geological formation are typically performed using many devices including downhole formation tester tools.

Recent formation tester tools generally may have an elongated tubular body divided into several modules serving predetermined functions. A typical tool may have: a hydraulic power module that converts electrical into hydraulic power; a telemetry module that provides electrical and data communication between the modules and an uphole control unit; one or more probe modules collecting samples of the formation fluids; a flow control module regulating the flow of formation and other fluids in and out of the tool; and a sample collection module that may contain chambers for storage of the collected fluid samples. The various modules of a tool can be arranged differently depending on the specific testing application, and may further include special testing modules, such as nuclear magnetic resonance (NMR) measurement equipment. In certain applications, the tool may be attached to a drill bit for logging-while-drilling (LWD) or measurement-while drilling (MWD) purposes.

It is desirable to increase the efficiencies and capabilities of formation tester tools. Moreover, hydrocarbons in oil and gas shales and other tight formations, such as tight sandstones and limestones, coal bed methane and the likes cannot be produced economically without one or more fracturing operations. To make such operations as effective and cost-efficient as possible, it is desirable to understand the formation mechanical stress properties.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure generally relates to testing and evaluation of subterranean formations and formation fluids and, more particularly, to systems and methods for measuring parameters of a formation.

Illustrative embodiments of the present invention are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Devices and methods in accordance with certain embodiments may be used in one or more of wireline, measurement-while-drilling (MWD) and logging-while-drilling (LWD) operations. Embodiments may be implemented in various formation tester tools suitable for testing, retrieval and sampling along sections of the formation that, for example, may be conveyed through flow passage in tubular string or using a wireline, slickline, coiled tubing, downhole robot or the like. Certain embodiments according to the present disclosure may be suited for use with a modular downhole formation tester tool, which may be the Reservoir Description Tool (RDT) by Halliburton.

Exemplary Formation Tester Tool

Figure 1:
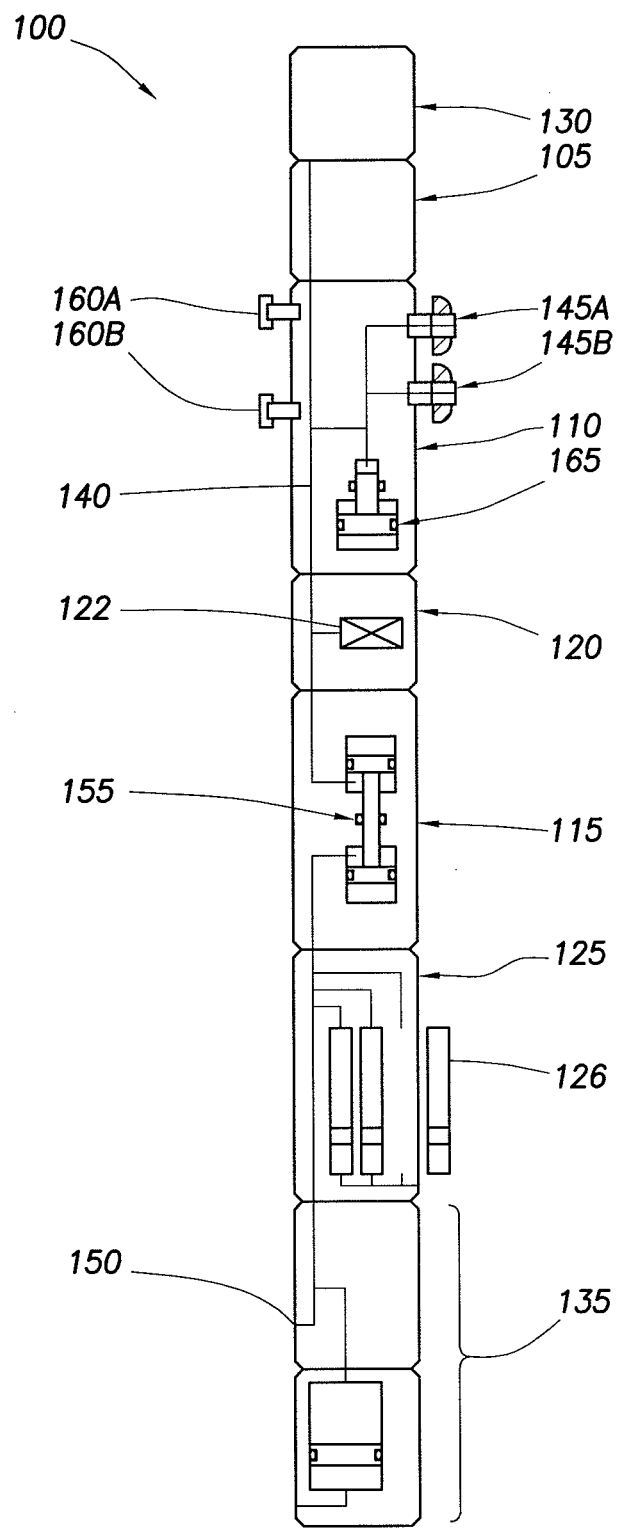
FIG. 1 is a cross-sectional schematic of an exemplary testing tool.

FIG. 1 illustrates a cross-sectional schematic of an example testing tool 100, which may be disposed in a borehole (not shown) traversing earth formations. The formation-testing tool 100 may be suitable for testing, retrieval and sampling along sections of a formation. Generally, in a typical operation, formation-testing tools may operate as follows. Initially, the tool is lowered on a wireline into the borehole to a desired depth and the probes for taking samples of the formation fluids are extended into a sealing contact with the borehole wall. Formation fluid may be drawn into the tool through inlets, and the tool may perform tests of the formation properties.

The testing tool 100 may include several modules (sections) capable of performing various functions. For example, as shown in FIG. 1, the testing tool 100 may include a hydraulic power module 105 that converts electrical into hydraulic power; a probe module 110 to take samples of the formation fluids; a flow control module 115 for regulating the flow of various fluids in and out of the tool 100; a fluid test module 120 for performing different tests on a fluid sample; a multi-chamber sample collection module 125 that may contain various size chambers for storage of the collected fluid samples; a telemetry module 130 that provides electrical and data communication between the modules and an uphole control unit (not shown), and possibly other sections designated in FIG. 1 collectively as 135. The arrangement of the various modules, and additional modules, may depend on the specific application and is not considered herein.

More specifically, the telemetry module 130 may condition power for the remaining sections of the testing tool 100. Each section may have its own process-control system and may function independently. The telemetry module 130 may provide a common intra-tool power bus, and the entire tool string (possible extensions beyond testing tool 100 not shown) may share a common communication bus that is compatible with other logging tools. This arrangement may enable the tool to be combined with other logging systems.

The formation-testing tool 100 may be conveyed in a borehole by wireline (not shown), which may contain conductors for carrying power to the various components of the tool and conductors or cables (coaxial or fiber optic cables) for providing two-way data communication between tool 100 and an uphole control unit (not shown). The control unit preferably includes a computer and associated memory for storing programs and data. The control unit may generally control the operation of tool 100 and process data received from it during operations. The control unit may have a variety of associated peripherals, such as a recorder for recording data, a display for displaying desired information, printers and others. The use of the control unit, display and recorder are known in the art of well logging and are, thus, not discussed further. In an exemplary embodiment, telemetry module 130 may provide both electrical and data communication between the modules and the uphole control unit. In particular, telemetry module 130 may provide a high-speed data bus from the control unit to the modules to download sensor readings and upload control instructions initiating or ending various test cycles and adjusting different parameters, such as the rates at which various pumps are operating.

The flow control module 115 of the tool may include a pump 155, which may be a double acting piston pump, for example. The pump 155 may control the formation fluid flow from the formation into flow line 140 via one or more probes 145A and 145B. The number of probes may vary depending on implementation. Fluid entering the probes 145A and 145B may flow through the flow line 140 and may be discharged into the wellbore via outlet 150. A fluid control device, such as a control valve, may be connected to flow line 140 for controlling the fluid flow from the flow line 140 into the borehole. Flow line fluids may be pumped either up or down with all of the flow line fluid directed into or though pump 155.

The fluid testing section 120 of the tool may contain a fluid testing device, which analyzes the fluid flowing through flow line 140. For the purpose of this disclosure, any suitable device or devices may be utilized to analyze the fluid. For example, a Halliburton Memory Recorder quartz gauge carrier may be used. In this quartz gauge the pressure resonator, temperature compensation and reference crystal are packaged as a single unit with each adjacent crystal in direct contact. The assembly is contained in an oil bath that is hydraulically coupled with the pressure being measured. The quartz gauge enables measurement of such parameters as the drawdown pressure of fluid being withdrawn and fluid temperature. Moreover, if two fluid testing devices 122 are run in tandem, the pressure difference between them may be used to determine fluid viscosity during pumping or density when flow is stopped.

The sample collection module 125 of the tool may contain one or more chambers 126 of various sizes for storage of the collected fluid sample. A collection chamber 126 may have a piston system 128 that divides chamber 126 into a top chamber 126A and a bottom chamber 126B. A conduit may be coupled to the bottom chamber 126B to provide fluid communication between the bottom chamber 126B and the outside environment such as the wellbore. A fluid flow control device, such as an electrically controlled valve, can be placed in the conduit to selectively open it to allow fluid communication between the bottom chamber 126B and the wellbore. Similarly, chamber section 126 may also contain a fluid flow control device, such as an electrically operated control valve, which is selectively opened and closed to direct the formation fluid from the flow line 140 into the upper chamber 126A.

The probe module 110 may generally allow retrieval and sampling of formation fluids in sections of a formation along the longitudinal axis of the borehole. The probe module 110, and more particularly one or more probes 145A, 145B, may include electrical and mechanical components that facilitate testing, sampling and retrieval of fluids from the formation. The one or more probes may each comprise a sealing pad that is to contact the formation or formation specimen. In certain embodiments, the sealing pad may be elongated. Through one or more slits, fluid flow channel or recesses in the sealing pad, fluids from the sealed-off part of the formation surface may be collected within the tester through the fluid path of the probe.

In the illustrated embodiment, one or more setting rams 160A and 160B may be located generally opposite probes 145A and 145B of the tool. Rams 160A and 160B may be laterally movable by actuators placed inside the probe module 110 to extend away from the tool. Pretest pump 165 may be used to perform pretests on small volumes of formation fluid. Probes 145A and 145B may have high-resolution temperature compensated strain gauge pressure transducers (not shown) that can be isolated with shut-in valves to monitor the probe pressure independently. Pretest piston pump 165 may have a high-resolution, strain-gauge pressure transducer that can be isolated from the intra-tool flow line 140 and probes 145A and 145B. Finally, the module may include a resistance, optical or other type of cell (not shown) located near probes 145A and 145B to monitor fluid properties immediately after entering either probe.

With reference to the above discussion, the formation-testing tool 100 may be operated, for example, in a wireline application, where tool 100 is conveyed into the borehole by means of wireline to a desired location ("depth"). The hydraulic system of the tool may be deployed to extend one or more rams 160A and 160B and sealing pad(s) including one or more probes 145A and 145B, thereby creating a hydraulic seal between sealing pad and the wellbore wall at the zone of interest. To collect the fluid samples in the condition in which such fluid is present in the formation, the area near the sealing pad(s) may be flushed or pumped. The pumping rate of the piston pump 155 may be regulated such that the pressure in flow line 140 near the sealing pad(s) is maintained above a particular pressure of the fluid sample. Thus, while piston pump 155 is running, the fluid-testing device 122 may measure fluid properties. Device 122 may provide information about the contents of the fluid and the presence of any gas bubbles in the fluid to the surface control unit. By monitoring the gas bubbles in the fluid, the flow in the flow line 140 may be constantly adjusted so as to maintain a single-phase fluid in the flow line 140. These fluid properties and other parameters, such as the pressure and temperature, may be used to monitor the fluid flow while the formation fluid is being pumped for sample collection. When it is determined that the formation fluid flowing through the flow line 140 is representative of the in situ conditions, the fluid may then be collected in the fluid chamber(s) 126.

Figure 2:
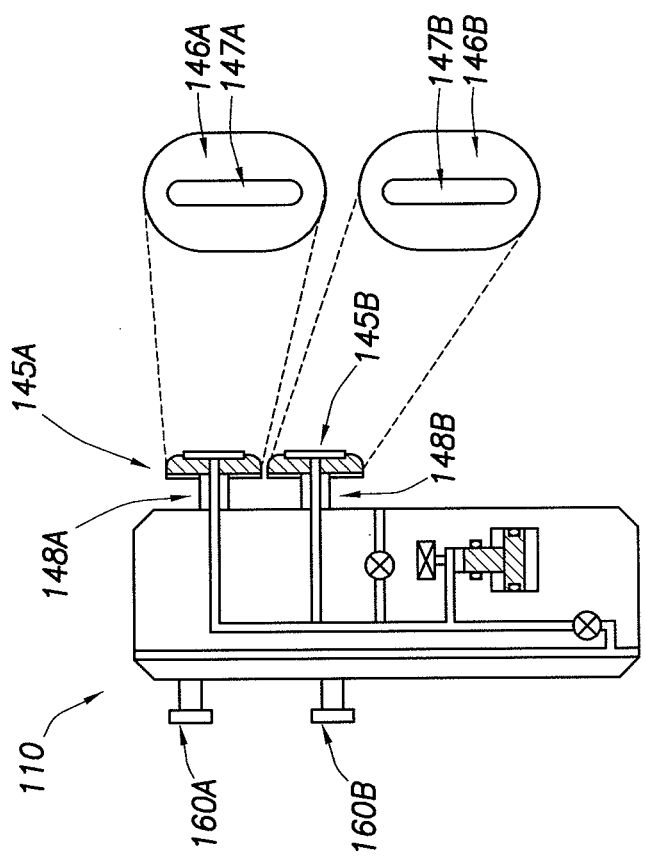
FIG. 2 is a detailed view of the probe module of the exemplary testing tool of FIG. 1.

FIG. 2 is a more detailed view of the probe module 110. As depicted, the probes 145A and 145B may have sealing pads 146A and 146B, respectively, for sealing off a portion on the side wall of a borehole. In certain embodiments, the sealing pads 146A and 146B may have slits 147A and 147B, respectively, for fluid sample collection. In certain embodiments, the sealing pads 146A, 146B may be elongated and may be removably attached for easy replacement. The sealing pads 146A, 146B may be supported by hydraulic pistons 148A and 148B. In an alternative design (not shown), a single elongated sealing pad may be supported by one or more pistons. A design using two elongated pads on the same tool may have the advantage of providing a greater longitudinal length that could be covered with two pads versus one. It will be apparent that other configurations may be used in alternate embodiments.

When in a borehole, the probes 145A and 145B may be held firmly in place against an open face of the formation. The one or more setting rams 160A and 160B may be located generally opposite the probes 145A, 145B and may be used to press against the formation diametrically opposite from the probes 145A, 145B. This combination may keep the tool positioned such that the sealing pads 146A, 146B are pressed firmly against the exposed formation. In this configuration, the sealing pads 146A, 146B make a competent seal against the formation and facilitate testing. However, this configuration may also be limited in access to the reservoir information. Even in the dual probe mode, more vertical reservoir properties are accessed than radial properties. This can be a shortcoming when reservoirs are thin and laminated and cross correlations across a radial boundary can be insightful.

Radially Aligned Probes for Improved Reservoir Description

Figure 3:
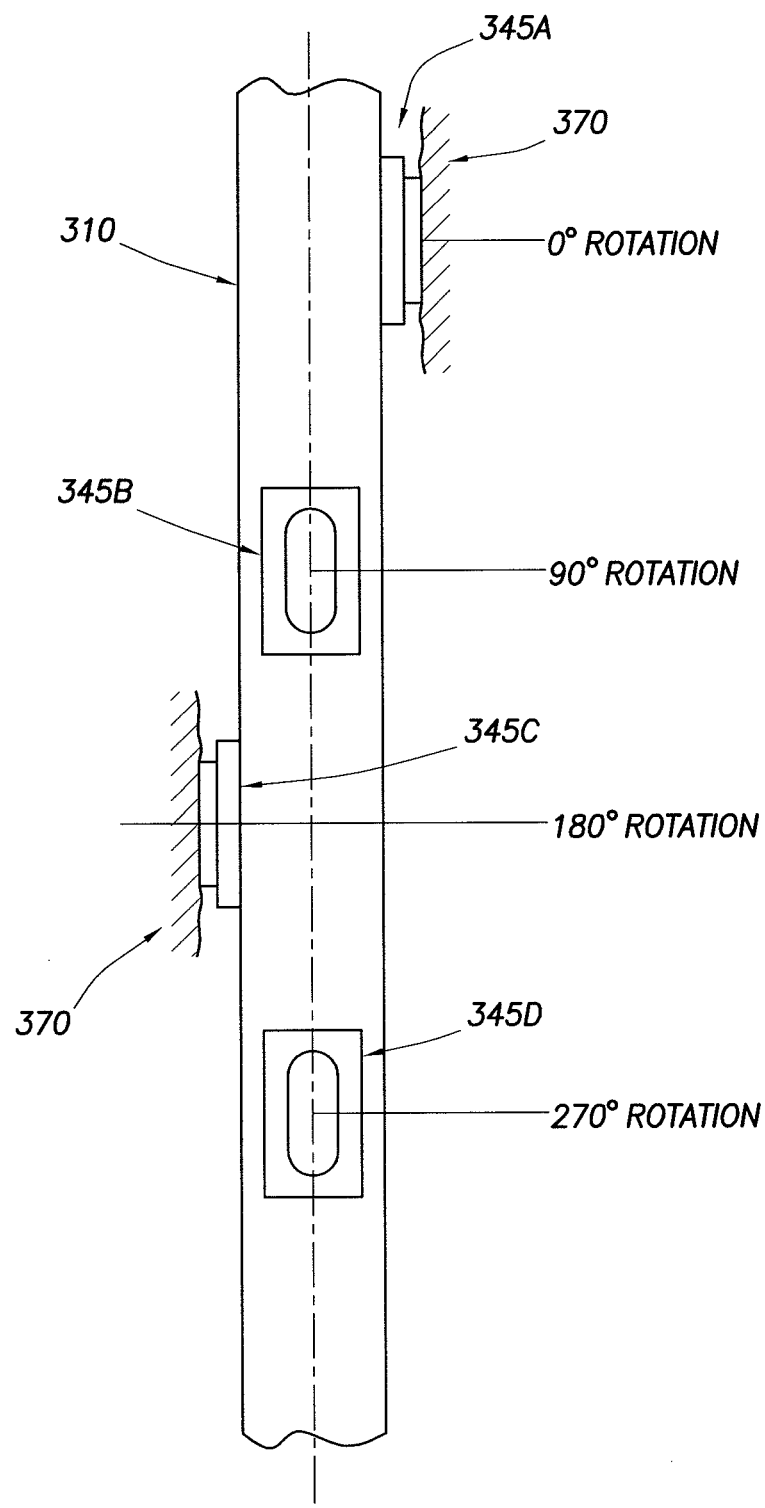
FIG. 3 is a partial diagram of a formation tester tool in a wellbore, in accordance with certain exemplary embodiments of the present disclosure.

Instead of a plurality of probes in the same vertical plane, a plurality of probes may be disposed in a radial configuration. FIG. 3 is a partial diagram of a formation tester tool 310 in a wellbore, in accordance with certain exemplary embodiments of the present disclosure. As depicted, the probe module 310 may include probes 345A, 345B, 345C, 345D in a radial configuration, each probe 90 degrees from two other probes and 180 from a third probe. While a non-limiting exemplary configuration is depicted, it should be understood that other configurations may be implemented. For example, if only two probes are to be used, the probes may be placed 180 degrees apart, approximately 180 degrees apart, or in a diametrically or substantially diametrically opposed configuration. In other embodiments, the two probes may be less than 180 degrees apart, for example, 90 degrees apart. As result of such configurations, setting rams may be unnecessary because at least two probes may provide counter-acting forces needed to keep the tool properly positioned and the sealing pads firmly pressed against the surfaces of the formation 370. Similar considerations may be used with other exemplary configurations of three or more probes. The angular displacement of the probes may be adapted to preserve symmetry as shown in FIG. 3 for one example 4-probe configuration. Such a configuration may provide more access to the reservoir for data description.

Measuring Bi-Axial and Tri-Axial Formation Stress Parameters

For the most part, the hydrocarbons in oil and gas shales and other tight formations, such as tight sandstones and limestones, coal bed methane and the like cannot be produced economically without one or more fracturing operations. To make such operations as effective and cost-efficient as possible, it is desirable to understand the formation mechanical stress properties and fracture model. Measurements of formation mechanical properties have been discussed elsewhere. Another important aspect of the formation fracture model is a determination of orientation and magnitude of the stresses in the formation. While formation stress measurements may be indirect, certain embodiments of the present disclosure provide a more direct, in-situ method of measuring formation stresses and fluid mobilities along multiple axes.

The measurements may be made using wireline or LWD deployed formation tester tools fitted with one or more padded probes such as those of FIGS. 1-3. The probes may have any suitable seal surfaces, which may include multiple varieties. The probes may be circular or oval-shaped with one or more sealing surfaces or ribs. The probes should be able to seal effectively the differential pressures between the center of the probe and the borehole annulus, which may be on the order of several thousand psi. In some embodiments, a formation tester tool may employ round or oval-padded probes oriented at right angles.

With the pads at different azimuths, fracture closure pressures at different fracture orientations may be measured, enabling a determination of formation stress in a direction perpendicular to the fracture. A tool only using one probe would require reorientation 90° offset from a first measurement to obtain a second measurement—which would be almost impossible to do when using a wireline tool and quite difficult and time-consuming to do using LWD tools.

Figure 4:
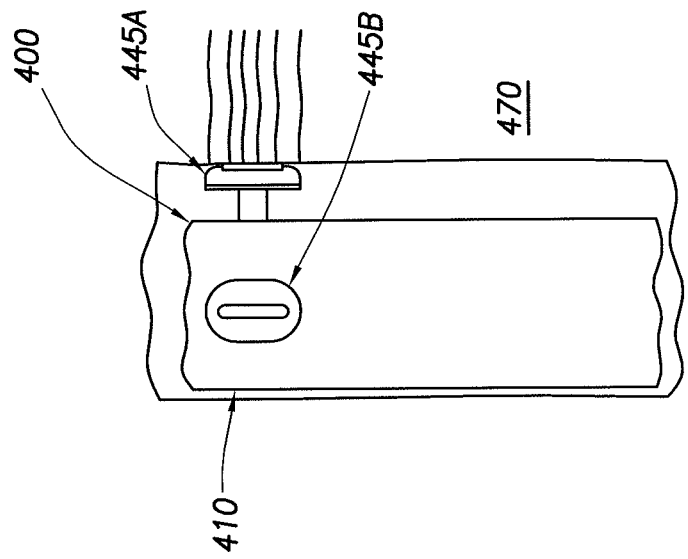
FIG. 4 is a partial diagram of a formation tester tool in a wellbore, in accordance with certain exemplary embodiments of the present disclosure.

FIG. 4 is a partial diagram of a formation tester tool 410 with probe configuration 400, where probes 445A and 445B are disposed at or about 90 degrees from each other and at the same along-hole depth. With two probes at 90°—e.g., two adjacent probes of the non-limiting examples of probes 345A-D or probes 445A, 445B—biaxial stresses may be measured simultaneously and at the right offset angles. For example, the tool may be configured to orient the probes may press against the top side and horizontal side of the formation 470, or other orientations (with or without more probes) may be measured.

In certain embodiments, the tool may further include a second set of probes axially offset from the first set of probes—e.g., another set of two adjacent probes of probes 345A-D or a set of two adjacent probes similar to probes 445A, 445B disposed at the same along-hole depth. With measurements at multiple axial positions, the gradient along the borehole axis may be calculated to yield the stress in the axial direction. Thus, the stress directions and magnitudes may be determined for use in a fracture model.

Figure 6:
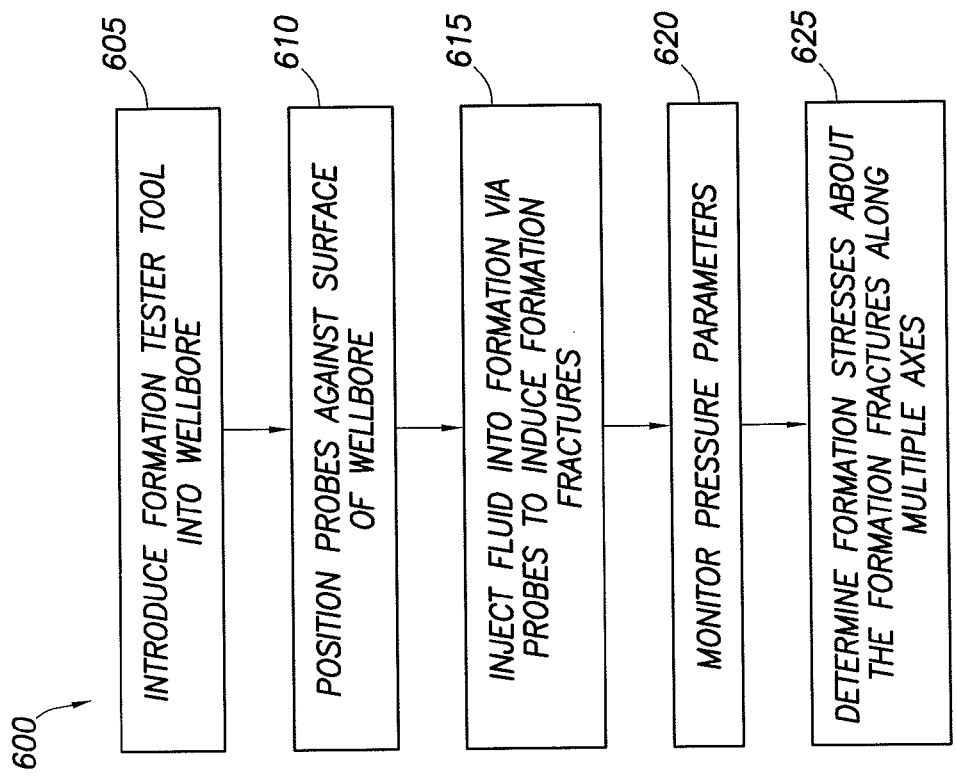
FIG. 6 is flow diagram for an example method of measuring parameters of a formation along multiple axes, in accordance with certain embodiments of the present disclosure.
Figure 5:
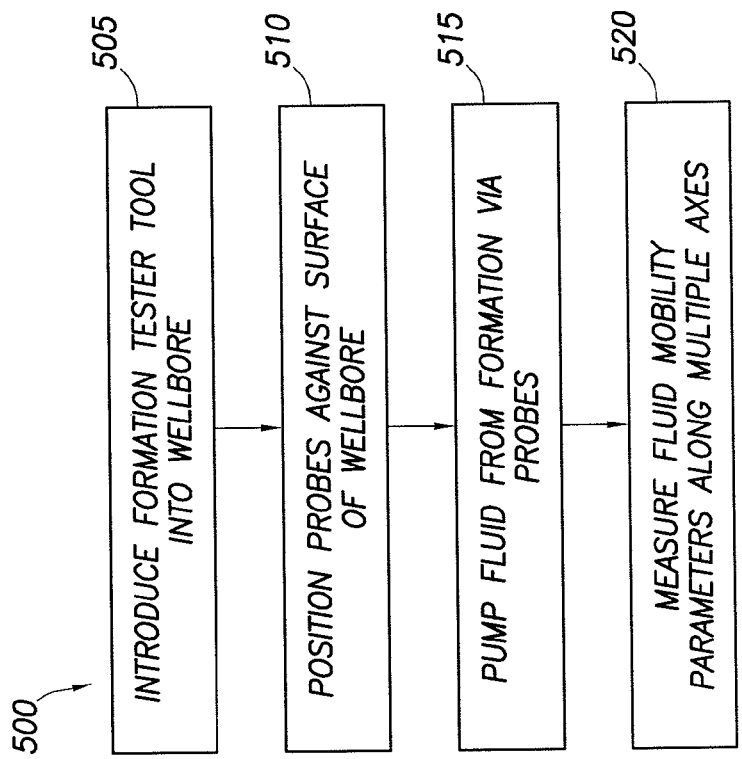
FIG. 5 is flow diagram for an example method of measuring parameters of a formation along multiple axes, in accordance with certain embodiments of the present disclosure.

FIGS. 5 and 6 depict flow diagrams for example methods 500 and 600 of measuring parameters of a formation along multiple axes, in accordance with certain embodiments of the present disclosure. Teachings of the present disclosure may be utilized in a variety of implementations. As such, the order of the steps comprising the methods 500 and 600 may depend on the implementation chosen. In varying embodiments, the steps comprising the methods 500 and 600 may be performed in combination. In varying embodiments, the measurements and/or fracturing processes may be performed with one probe at a time or any combination of multiple probes simultaneously.

The formation tester tool may be introduced into a wellbore as indicated by steps 505, 605. The probes may be deployed against a surface of the wellbore as indicated by steps 510, 610. In certain embodiments indicated by step 515, fluid may be pumped from the formation via the probes for fluid mobility measurements. At step 520, fluid mobility parameters may be measured along multiple axes based, at least in part, on the fluid pumped from the formation via the first and second probes. The measured fluid mobility parameters may indicate fluid mobility characteristics along multiple axes.

In certain embodiments indicated by step 615, fluid may be injected into the formation via the probes to clean the borehole adjacent to the probes. Cleaning the boreholes adjacent to the probes helps to remove the mud cake that may be formed by drilling and to speed up the time required to obtain pristine samples. In other embodiments, fluid may be injected into the formation via the probes to induce formation fractures. In certain embodiments, fluid, which may be fluid previously received from the formation (e.g., fluid pumped for mobility measurements) or any suitable fluid, may be injected into the formation via the probes to induce a formation fracture. At step 620, pressure parameters corresponding to the fluid injected into the formation may be monitored. During the fracturing phase, pressure parameters may be monitored. For example, pressure may be monitored as a function of time to determine one or more of: (1) fracture initiation pressure; (2) formation permeability; (3) formation pore pressure; and (4) fracture closure pressure. The transients in the pressure profile may also yield information about fracture volume, which may provide some indication of fracture orientation—longitudinal (fin) or transverse (pancake). At step 625, formation stresses about the formation fractures along multiple axes may be determined based, at least in part, on the pressure parameters.

One objective may be to obtain fluid mobility and formation stress measurements at the same along-hole depth position in the well in at least two orthogonal directions for deriving mechanical formation stress in two axes. Additional measurements at the same orthogonal orientations may be made slightly offset in along-hole depth for the third axis. In many cases, however, two-axis measurements may suffice for fracture stimulation purposes.

A fracture model may be implemented by a processor and memory that may be part of an uphole control unit, part of a downhole module, or part of a remote computer system, for example. Fractures and faults play an important role in controlling the hydraulic properties of rocks by providing permeable conduits for fluids. On the other hand, the presence of fluids strongly influences deformation and rupture of rocks by controlling fluid pressure and geochemical properties within fractures and faults. However, not all fractures and faults contribute to fluid flow or are equally important for failure and deformation processes in the crust. In general, fracture-enhanced permeability depends on fracture density, orientation, and, most importantly, hydraulic conductivity of the individual fractures and faults present. This is especially important in hydrocarbon reservoirs with low matrix permeability where fractures are the primary pathways for oil and gas migrating from the source rocks into their reservoirs. Therefore, it is important to discriminate hydraulically conductive from hydraulically nonconductive fractures and faults to increase the efficiency of oil production and reservoir development. These needs make it important to understand in-situ stresses in rocks.

There are several different methods that may be performed for measuring in-situ stress, such as hydraulic fracturing, overcoring, borehole slotting and flat jack. However, most common methods are hydraulic and relief methods. Among the other methods, hydrofracturing method is the easiest, quick and simple in measuring in situ stress. Hydraulic fracturing is created by applying hydraulic pressure to a drill hole to determine the fracture pressure and hence the stress. The magnitude of maximum and minimum secondary horizontal stress, which is a component for impermeable rocks in vertical drill hole, may be determined with the following equation.

$$\sigma_H = 3*\sigma_h + S_t - P_i - P_o \quad \text{(Equation 1)}$$

where $\sigma_H$ is maximum secondary horizontal stress; $\sigma_h$ is minimum secondary horizontal stress; $S_t$ is fracture strength of the rock which is equal to $P_i - P_r$; $P_i$ is fracture initiation pressure; $P_r$ is fracture reopening pressure; and $P_o$ is ambient pore pressure. The magnitude of the minimum secondary horizontal stress is equal to shut-in pressure $S_i$.

Figure 7:
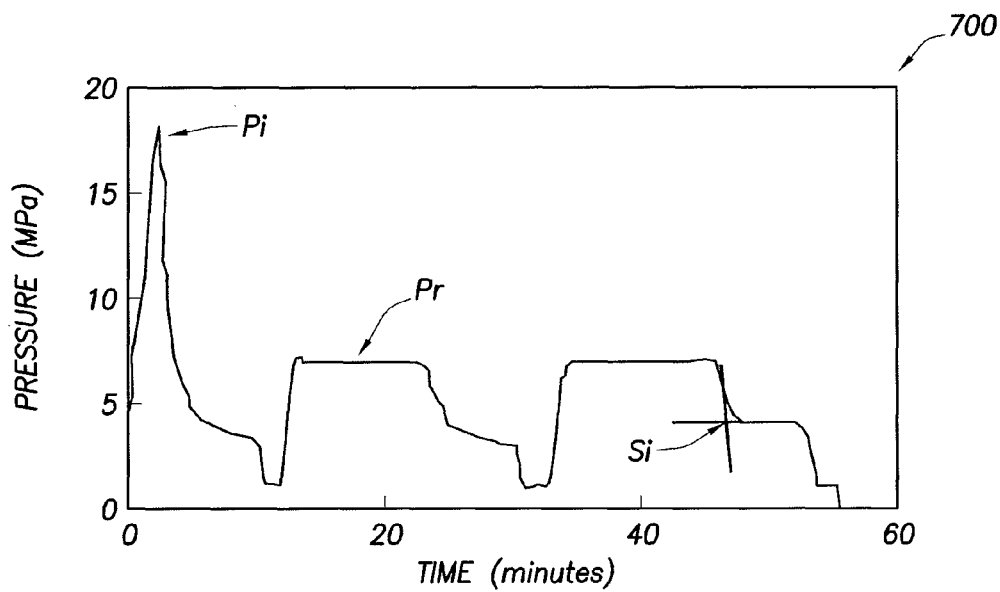
FIG. 7 is a graph of an exemplary pressure versus time curve for a hydrofracturing test.
Figure 8:
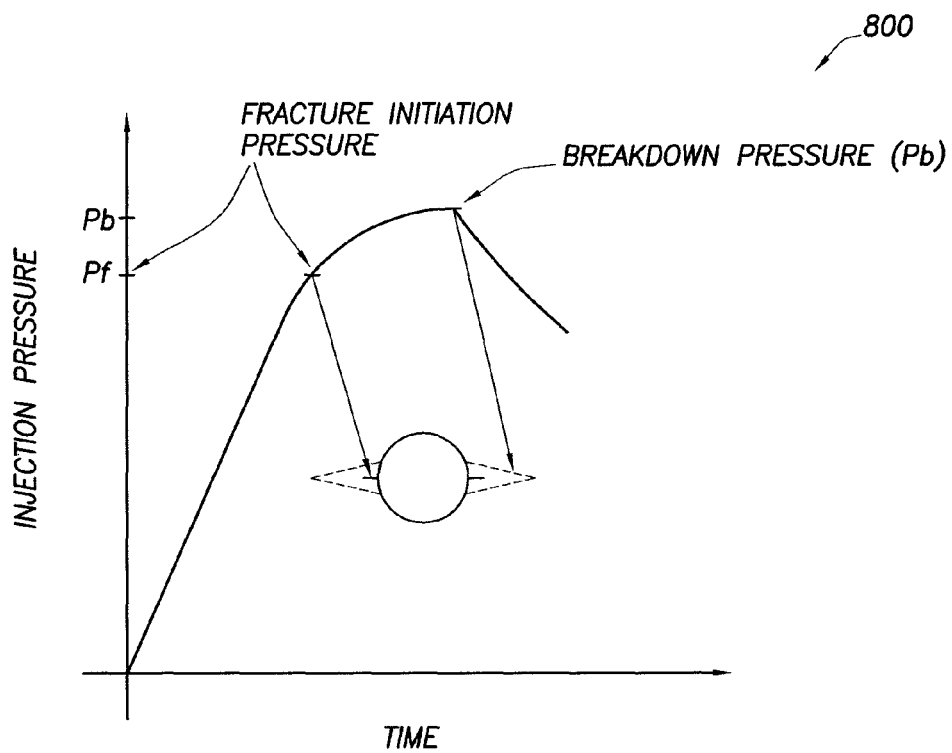
FIG. 8 shows an exemplary theoretical model of fracture initiation and breakdown pressures.

The vertical stress can be estimated from the overburden by:

$$\sigma_v = \gamma h \quad \text{(Equation 2)}$$

where $\sigma_v$ is the vertical stress; h is overburden; and $\gamma$ is average density of rock mass. FIG. 7 shows an exemplary pressure versus time curve 700 for a hydrofracturing test, in which $P_i$, $P_r$ and $S_i$ are indicated.

This above method may yield unsatisfactory results in certain cases. For example, in hydrostatic loading, there may be no information of in situ stress that can be obtained from fracture breakdown analyses in a borehole surrounded by plastic yielded material. For relatively hard rocks, only a trivial plastic zone may be induced during borehole excavation and drilling; however, features of non-linear behavior may be dominant. Particularly for relatively weak rock, the strength and Young's modulus may be controlled by the confining stress.

FIG. 7 shows an exemplary theoretical model 700 of fracture initiation and breakdown pressures. Referring to FIG. 7, during hydraulic fracturing, the tangential stress may approach zero for tension free rocks and become negative for rocks with a tensile strength (assuming that compression is positive). A non-constant Young's modulus related to the minimum stress, which, in the case of injection, is $\sigma_\theta$ (tangential stress).

With a radially symmetrical system, equilibrium can be shown as:

$$\frac{d\sigma_r}{dr} + \frac{\sigma_r - \sigma_\theta}{r} = 0 \qquad \text{(Equation 3)}$$

This can also be written as:

$$\int_{P_r}^{\sigma_r} \frac{d\sigma_r}{\sigma_r - \sigma_\theta} = \log\left(\frac{r}{a}\right) \qquad \text{(Equation 4)}$$

where:
  $\sigma_r$=radial stress
  $\sigma_\theta$=tangential stress
  r=radial distance from the axis
  a=internal boundary With some simplifications and assumptions, the following equations for radial stress and tangential stress for non-linear and linear elastic conditions have been established.

Non-Linear Elastic Condition:

$$\sigma_r = \sigma_h \left\{ 1 - \left[1 - \left(\frac{P_w}{\sigma_h}\right)^{\frac{1}{\nu}}\right]\left(\frac{a}{r}\right)^{\frac{1}{\nu}} \right\}^\nu \qquad \text{(Equation 5)}$$

$$\sigma_\theta = \sigma_h \left\{ 1 - \left[1 - \left(\frac{P_w}{\sigma_h}\right)^{\frac{1}{\nu}}\right]\left(\frac{a}{r}\right)^{\frac{1}{\nu}} \right\}^{\nu-1} \qquad \text{(Equation 6)}$$

Linear Elastic Condition:

$$\sigma_r = \sigma_h\left[1 - \left(\frac{a}{r}\right)^2\left(1 - \frac{P_w}{\sigma_h}\right)\right] \qquad \text{(Equation 7)}$$

$$\sigma_r = \sigma_h\left[1 + \left(\frac{a}{r}\right)^2\left(1 - \frac{P_w}{\sigma_h}\right)\right] \qquad \text{(Equation 8)}$$

where:
  $P_w$=Injection Pressure
  $\sigma_h$=Far field Strength
  $\nu$=Poisson Ratio Accordingly, with certain embodiments according to the present disclosure, stress determinations may be made without dependence on acoustic tool measurements and/or seismic measurements and deriving Young's modulus and Poisson ratio values therefrom. Moreover, certain embodiments of the present disclosure provide a more direct, in-situ method of measuring formation stresses and fluid mobilities along multiple axes.

The methods associated with different embodiments described above can be implemented with software programs, taking input from respective measurement data and generating a fracture model. These software programs can associate different directional property values with spatial units along the path in the formation based on the measurement data. These software programs can be integrated into existing tester tools, such as Halliburton's RDT, in the processing of measurement data.

Certain embodiments may be implemented by a processor and memory that may be part of an uphole control unit, part of a downhole module, or part of a remote computer system, for example. Certain embodiments may be implemented with a computer system that may include any instrumentality or aggregate of instrumentalities operable to compute, classify, process, transmit, receive, retrieve, originate, switch, store, display, manifest, detect, record, reproduce, handle, or utilize any form of information, intelligence, or data. The computer system may include random access memory (RAM), one or more processing resources such as a central processing unit (CPU) or hardware or software control logic, ROM, and/or other types of nonvolatile memory. For the purposes of this disclosure, computer-readable media may include any instrumentality or aggregation of instrumentalities that may retain data and/or instructions for a period of time. Computer-readable media may include, for example without limitation, storage media such as a direct access storage device, a sequential access storage device, compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method of measuring parameters of a formation along multiple axes, the method comprising:
  introducing a formation tester tool into a wellbore, wherein the formation tester tool comprises a pump and a first plurality of probes axially offset from a second plurality of probes about an axis of the formation tester tool;
  positioning the first and second plurality of probes against a surface of the wellbore;
  inducing formation fractures by injecting fluid into the formation via the first and second plurality of probes to induce formation fractures using the pump;
  receiving a plurality of measurements from the first plurality of probes and the second plurality of probes, wherein the plurality of measurements are associated with a plurality of axial positions of the formation tester tool;
  calculating a gradient along the wellbore axis based, at least in part, on the plurality of measurements;
  monitoring at the formation tester tool pressure parameters corresponding to the fluid injected into the formation; and
  determining formation stresses about the formation fractures along multiple axes based, at least in part, on the pressure parameters and the gradient.

2. The method of claim 1, wherein injecting fluid into the formation via at least one of the first and second plurality of probes further comprises injecting fluid to clean the borehole adjacent to the first and second plurality probes.

3. The method of claim 1, further comprising:
  determining a pressure profile based, at least in part, on the pressure parameters.

4. The method of claim 3, wherein the pressure profile indicates one or more of a fracture volume and a fracture orientation.

5. The method of claim 1, wherein the step of monitoring pressure parameters further comprises monitoring pressure parameters to determine one or more of a fracture initiation pressure, a formation permeability, a formation pore pressure, and a fracture closure pressure.

6. A formation tester tool to measure parameters of a formation along multiple axes, the formation tester tool comprising:
- a first plurality of probes axially offset from a second plurality of probes about an axis of the formation tester tool, wherein each of the first probe and the second probe comprises an inlet in fluid communication with an interior of the formation tester tool, and wherein each of the first plurality of probes and the second plurality of probes comprises an outer surface configured to hydraulically seal a region along a surface of a borehole;
- a pump disposed about an axis of the formation tester tool configured to inject fluid into the formation to induce formation fractures via the first and second plurality of probes;
- a pressure detection device configured to detect pressure parameters corresponding to the injected fluid; and
- a downhole module comprising a processor and a memory, wherein the processor is operable to execute one or more instructions stored on the memory to:
  - receive a plurality of measurements from the first plurality of probes and the second plurality of probes, wherein the plurality of measurements are associated with a plurality of axial positions of the formation tester tool;
  - calculating a gradient along the wellbore axis based, at least in part, on the plurality of measurements;
  - monitor the pressure parameters; and
  - determine formation stresses about the formation fractures along multiple axes based, at least in part, on the pressure parameters and the gradient.

7. The formation tester tool of claim 6, wherein the pump is configured to pump a fluid from the formation via one or more of the first plurality of probes and the second plurality of probes, and wherein one or more of the first plurality of probes and the second plurality of probes are configured to
measure fluid mobility parameters along multiple axes based, at least in part, on the fluid pumped from the formation via the first and second plurality of probes.

8. The formation tester tool of claim 7, wherein the first plurality of probes and the second plurality of probes are configured to be repositionable to a plurality of positions against the surface of the borehole, and wherein one or more of the first plurality of probes and the second plurality of probes are configured to
measure fluid mobility parameters based, at least in part, on the fluid pumped from the formation.

9. The formation tester tool of claim 8, wherein the one or more of the first plurality of probes and the second plurality of probes are configured to measure fluid mobility parameters indicative of fluid mobility characteristics along three axes.

10. The formation tester tool of claim 7, further comprising:
- a third probe oriented an angle from a fourth probe about the axis of the formation tester tool, wherein the pump is configured to pump the fluid from the formation via one or more of the third probe and the fourth probe, and wherein the third probe and the fourth probe are configured to
measure fluid mobility parameters based, at least in part, on the fluid pumped from the formation.

11. The formation tester tool of claim 10, wherein one or more of the third probe and the fourth probe are configured to measure fluid mobility parameters indicative of fluid mobility characteristics along three axes.

* * * * *